United States Patent [19]

Miyaoka et al.

[11] 4,308,150
[45] Dec. 29, 1981

[54] OPERATION CONTROL METHOD FOR A WATERWORKS SYSTEM

[75] Inventors: Shinichiro Miyaoka, Kawasaki; Kuniaki Matsumoto, Sagamihara; Mikihiko Onari, Kokubunji; Nihei Tachi, Hitachi, all of Japan

[73] Assignee: Hitachi, Ltd., Tokyo, Japan

[21] Appl. No.: 161,053

[22] Filed: Jun. 19, 1980

[30] Foreign Application Priority Data

Jun. 27, 1979 [JP] Japan ................................. 54-80188

[51] Int. Cl.³ ............................................. C03B 1/04
[52] U.S. Cl. ................................. 210/739; 210/614; 210/96.1; 210/921
[58] Field of Search ............... 210/614, 739, 744, 920, 210/921, 98, 87–89, 96.1, 170, 747

[56] References Cited

U.S. PATENT DOCUMENTS 2,379,554 7/1945 Tyler ................................... 210/747
3,211,167 10/1965 Clift et al. ........................... 210/170
3,478,884 11/1969 McPherson et al. ............... 210/170

OTHER PUBLICATIONS

Perkins P. R.; "An Introduction to Computers in Process Control", found in, *Progress in Water Technology;* vol. 6 pp. 424–431 (1974).
Wells B. W.; "An Application Study of Computer Control for Sewage Treatment" in *Progress in Water Technology;* vol. 6 pp. 405–416 (1974).

*Primary Examiner*—Benoît Castel
*Attorney, Agent, or Firm*—Craig and Antonelli

[57] ABSTRACT

In a waterworks system wherein a plurality of zones are coupled by pipes, each of the zones including one purification plant and at least one service reservoir for supplying consumers with clear water fed from the purification plant;

before initiation of the operation of the system on a particular day, planned values of pipe flows to be interchanged among the zones, planned values of treated water volumes of the purification plants in the respective zones and planned values of water storage volumes of said respective zones at respective times of said particular day are determined in advance, the treated water volumes of said purification plants and the pipe flows are respectively controlled on the basis of said planned values of said pipe flows and said planned values of said treated water volumes at said respective times and also values of the water storage volumes of said respective zones are observed at said respective times of said particular day, deviations between the observed values of said water storage volumes and said planned values thereof are detected in said respective zones, in case where the deviation of one zone among said respective zones falls outside a predetermined range at a certain time, the planned value of the pipe flow between said one zone and another zone after said certain time is modified, said pipe flow between said one zone and said another zone being controlled on the basis of the modified planned value thereof after said certain time, and only in case where said deviation of said one zone is not yet put into said predetermined range by the aforecited modification, the planned value of the treated water volume of the purification plant in said one zone is modified, said treated water volume of said purification plant of said one zone being controlled on the basis of the modified planned value thereof after said certain time.

9 Claims, 8 Drawing Figures

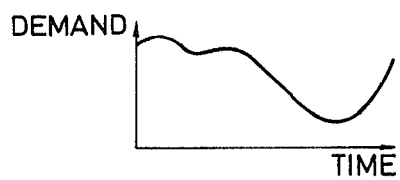
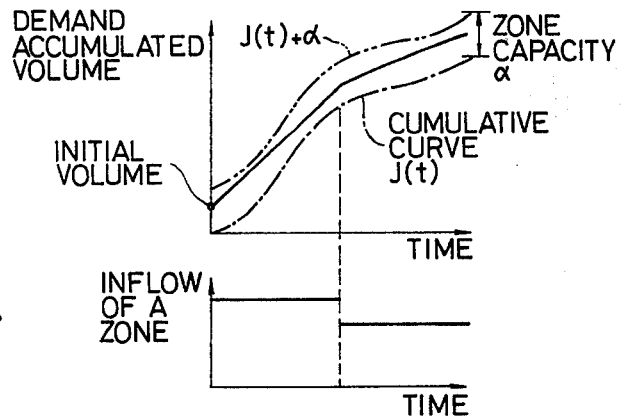
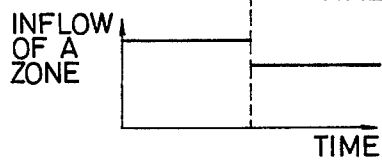
FIG. 3A
FIG. 3B
FIG. 3C
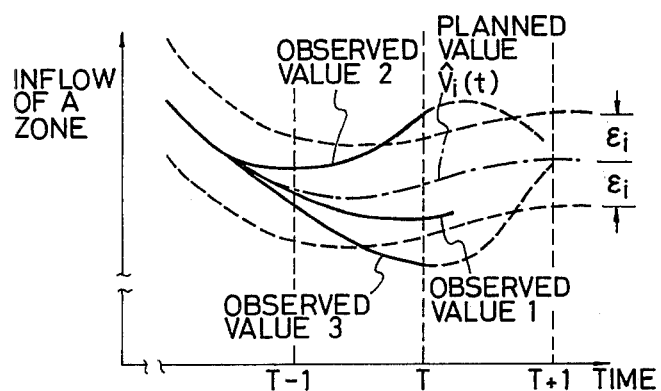
FIG. 4

OPERATION CONTROL METHOD FOR A WATERWORKS SYSTEM

BACKGROUND OF THE INVENTION

This invention relates to an operation control method for a waterworks system. More particularly, it relates to an operation control method for a waterworks system which includes a plurality of purification plants and a plurality of reservoirs fed with water therefrom and in which the purification plants, the purification plant and the reservoir, etc. are coupled in the shape of a network by pipes.

In general, a long time delay of flow is involved in the transportation of water. It is therefore very difficult that an appropriate operation control of, for example, a purification plant in a waterworks system is made by the feedback control only. Heretofore, the increase or decrease of a treated water volume in the purification plant and the attendant increase or decrease of an intake volume have been controlled in such a way that an operator in the purification plant empirically preestimates a demand for a few hours from an occasional water supply volume and ambient conditions such as weather and temperature.

However, in the complicated waterworks system as above stated wherein the pipes are arranged in the shape of a network and many purification plants interchange water to one another, an appropriate control is next to impossible with the empirical operation control. An eager request for an operation control of a waterworks system with the saving of energy and the saving of resources taken into consideration cannot be met, either.

SUMMARY OF THE INVENTION

An object of this invention is to provide an appropriate and economical operation control system and method for a waterworks system which includes a plurality of purification plants and which has a complicated pipe network configuration.

The above-mentioned object is achieved by an operation control method for a waterworks system in which a plurality of zones are coupled by pipes, each of the zones including one purification plant and at least one service reservoir for supplying consumers with clear water fed from the purification plant; characterized by the step of determining in advance before initiation of an operation of a particular day, planned values of pipe flows to be interchanged among the zones, planned values of treated water volumes of the purification plants in the respective zones and planned values of water storage volumes of said respective zones at respective times of said particular day, the step of thereafter controlling the treated water volumes of said purification plants and the pipe flows respectively on the basis of said planned values of said pipe flows and said planned values of said treated water volumes at said respective times and also observing values of the water storage volumes of said respective zones, at said respective times of said particular day, the step of detecting deviations between the observed values of said water storage volumes and said planned values thereof in said respective zones, the step of modifying in case where the deviation of one zone among said respective zones falls outside a predetermined range at a certain time, the planned value of the pipe flow between said one zone and another zone after said certain time, said pipe flow between said one zone and said another zone being controlled on the basis of the modified planned value thereof after said certain time, and the step of modifying only in case where said deviation of said one zone is not yet put into said predetermined range by the aforecited modification, the planned value of the treated water volume of the purification plant in said one zone, said treated water volume of said purification plant of said one zone being controlled on the basis of the modified planned value thereof after said certain time.

Further objects, features and advantages of this invention will become apparent from the following description taken with reference to the accompanying drawings.

BRIEF DESCRIPTION OF THE DRAWINGS

FIG. 3A is a diagram showing a demand prediction curve of the zone for one day, FIG. 3B is a diagram showing a cumulative curve of the zone for one day, FIG. 3C is a diagram showing an inflow curve of the zone for one day, FIG. 4 is a diagram for explaining the modifications of the planned values of various controlled variables according to a water storage volume in the zone.

DETAILED DESCRIPTION OF THE PREFERRED EMBODIMENTS

Figure 1:
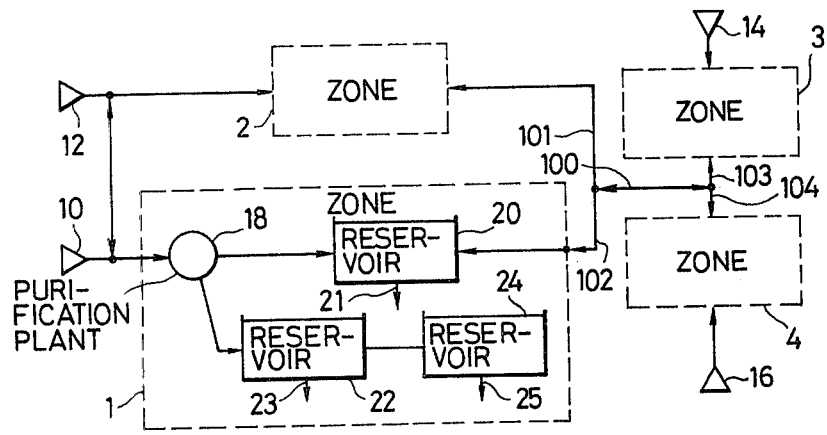
FIG. 1 is a diagram for explaining the concept of the "zoning" of a waterworks system pipe network as is applied in this invention.

Referring to FIG. 1, numerals 10, 12, 14 and 16 designate intake points. Water taken in from each intake point is guided to a purification plant 18. Clear water treated therein is fed to reservoirs 20, 22 and 24, from which the clear water is supplied to consumers. Arrows 21, 23 and 25 from the respective reservoirs indicate that the water is distributed to the consumers from the corresponding reservoirs.

In this manner, one purification plant 18 and a plurality of reservoirs which are fed with water from the former are combined into one group, which is termed a "zone". The illustrated waterworks system is an example in which there are four zones 1, 2, 3 and 4. Likewise to the zone 1 each of the zones 2, 3 and 4 indicated by dotted lines is constructed of one purification plant and several reservoirs fed with water therefrom, which are omitted from the figure. The numbers of reservoirs and the configurations of pipe networks existent within zones are inherent to the individual zones. A reservoir, such as the reservoir 20, which is coupled also to other zones by pipes is affiliated with a zone that is constructed centering around a purification plant from which the reservoir is principally fed with water. In the illustrated example, the reservoir 20 is principally fed with water from the purification plant 18 and therefore belongs to the zone 1 constructed centering around the purification plant 18. Here, a part 100 between branch points of the pipes and parts 101, 102, 103 and 104 between the branch points and the zones shall be called "pipe sections". Each of the zones of the waterworks system subjected to "zoning" or division in this manner can be regarded as having a water storage capacity equal to the sum of the capacities of all the reservoirs included in the zone, the water storage capacity being termed a "zone capacity". This zone capacity functions as a buffer for absorbing daily demand fluctuations in the corresponding zone. The total amount of water which is actually stored in all the reservoirs within the zone is termed a "water storage volume in the zone".

Figure 2:
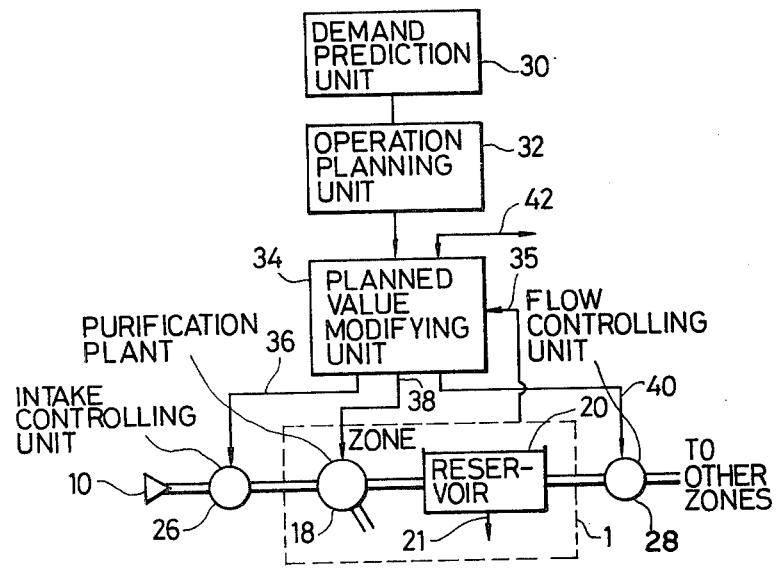
FIG. 2 is a diagram showing an example of construction of a control system in each of zones for performing this invention.

FIG. 2 shows an example of the construction of a control system for one zone of the waterworks system subjected to zoning as stated above. In the figure, the same constituent elements as in FIG. 1 are assigned the same reference numerals. Further, in the figure, numeral 26 designates a unit, for example, an intake gate or a pump, which controls the intake volume of raw water from the intake point 10. Numeral 28 designates a unit, for example, a pump or a valve, which controls the flow of water through the pipe coupling the zone 1 and the other zone (the pipe flow). Shown at 30 is a demand prediction unit, which predicts the total demand of the particular zone for the next day (24 hours) and the changes of the demand at any desired time intervals (for example, at intervals of 1 hour) by utilizing the data of actual results in the past and on the basis of a day of the week, the weather, the atmospheric temperature etc. Shown at 32 is an operation planning unit, which forms on the basis of a predicted demand value from the demand prediction unit 30 the operation plans of the particular zone, for example, an intake plan which determines the intake volume at the intake point 10, a purification plant operation plan which determines the treated water volume in the purification plant 18, etc. Shown at 34 is a planned value modifying unit, which at the beginning of the operation of the day modifies various planned values determined by the operation planning unit 32, on the basis of an observed value 35 of the water storage volume in the zone and then provides control signals 36, 38 and 40 for the intake controlling unit 26, the purification plant 18 and the pipe flow controlling unit 28 respectively. The observed value signal 35 of the water storage volume in the zone is obtained as the summation of water storage volumes individually observed in all the reservoirs existent within the particular zone. In the aforecited modifications of the planned values, although the details will be described later, not only the water storage situation of the particular zone but also the situations of the other zones are taken into account, and hence, signals therefor are exhanged between the control system of the particular zone and those of the other zones. In the figure, they are schematically indicated as a signal 42.

Referring now to FIGS. 3A, 3B, 3C and 4, the operation of this invention will be described.

As stated before, the demand prediction unit 30 predicts the demand for 24 hours and the changes thereof on the basis of the data of actual results in the past and in dependence on the weather, temperature, day of the week, etc. of the next day. As an example of a method for the prediction, there is the following method. Several patterns which indicate hourly changes in a daily demand depending upon the season, the day of the week, etc. are prepared on the basis of the data of the past results. These patterns are patterns which are normalized by the total daily demand. In conformity with the conditions of the day for the prediction, a corresponding one is selected from among these patterns. On the other hand, the total demand of one day is similarly predicted from the data of the past results and in dependence on the day of the week, the weather and temperature forecasts, etc. of the day for the prediction. Hourly demand changes for the 24 hours of the day for the prediction are evaluated from the selected pattern and the predicted total demand.

As the result of the prediction as stated above, a demand prediction curve of the particular zone for the day as shown in FIG. 3A is obtained.

The operation planning unit 32 accumulates the predicted value and obtains a demand cumulative curve $J(t)$ (refer to a one-dot chain line in FIG. 3B). Further, a curve $J(t)+\alpha$ (refer to a two-dot chain line in FIG. 3B) with the water storage capacity $\alpha$ of the particular zone added to the curve $J(t)$ is obtained to form a belt-shaped region as shown in FIG. 3B. The significance of this belt-shaped region is as follows. In a range in which an actual demand is less than the region, the necessary actual demand cannot be provided, whereas in a range in which the actual demand is more than the region, an overflow arises within the particular zone.

Subsequently, a straight line is set whose starting point is the water storage volume of the particular zone at the beginning of the operation of the day for the prediction, that is, the initial volume and which passes within the belt-shaped region. The initial volume is equal to the last water storage volume in the zone on the day before the day for the prediction. As the way of drawing the straight line within the belt-shaped region, it is considered by way of example to divide the day into the daytime and the nighttime at proper times within the 24 hours and to set two straight lines of fixed gradients for the respective sections (refer to a solid line in FIG. 3B). The gradients of these straight lines represent the necessary inflows of water to the particular zone (refer to FIG. 3C). Accordingly, the straight line shall be called the "necessary inflow line" hereinbelow (even in case where the necessary inflow is set in the form of the polygonal line as indicated by the solid line in FIG. 3B, the line shall be called the necessary inflow line). The necessary inflow line expresses the inflow to the particular zone as is required for providing the demand of the particular zone while holding the water storage volume in the zone at a proper value. Accordingly, the necessary inflow is provided by only the treated water volume in the purification plant of the particular zone in some cases, and it is supplemented by the volume of water given from another zone in other cases.

Although the foregoing way of drawing the necessary inflow line within the belt-shaped region has relied on the two straight lines having the respectively different fixed gradients for the two sections of the daytime and the nighttime, straight lines having respectively different gradients for sections further subdivided in time, not for the daytime and the nighttime, may be drawn as well. It is a matter of course that a single straight line of a fixed gradient may well be drawn over the 24 hours. However, a large number of changes in the gradient of the necessary inflow line signify that the number of times of modifying the necessary inflow, for example, modifying the treated water volume in the purification plant, i.e., modifying the operation is large. From the viewpoint of the ease of the operation of the purification plant, accordingly, it is desirable that the necessary inflow line is set so as to lessen the modifications to the utmost.

When the necessary inflow of the zone has been decided as stated above, the planned value of the treated water volume in the purification plant can be found on the basis of the necessary inflow. If the necessary inflow of the particular zone is provided premising the supplement from another zone, the planned value of the pipe flow from the other zone to the particular zone is also determined. The intake volume is decided according to the treated water volume, and hence, once the planned value of the treated water volume has been obtained, the planned value of the intake volume is naturally determined. When the necessary inflow line is set within the belt-shaped region as shown in FIG. 3B, its instantaneous value indicates an accumulated water inflow to the particular zone. In addition, the curve J(t) indicates the demand accumulated volume. Therefore, the difference between the necessary inflow line and the cumulative curve J(t) indicates the instantaneous water storage volume in the particular zone. Accordingly, when the operation has started on the basis of the various planned values obtained as stated above, actual changes in the water storage volume in the zone will become equal to the aforecited changes in the same if the demand prediction premised for obtaining the planned values is not wrong. In this sense, the water storage volume obtained from FIG. 3B can be termed the "planned value of the water storage volume of the particular zone".

In actuality, however, the actual water storage volume in the zone comes to deviate from the planned value of the water storage volume for such reasons that the demand prediction is somewhat wrong, etc. It is accordingly required to monitor the deviations and to modify the planned values of the treated water volume of the purification plant, the pipe flow, etc. so that the deviations may fall within predetermined ranges.

Now, the modifications of the planned values will be described in detail.

First, by way of example, the deviation $R_i$ between the observed value $V_i(T)$ and planned value $\hat{V}_i(T)$ of the water storage volume of a zone i at a time T is evaluated:

$$R_i = V_i(T) - \hat{V}_i(T) \quad (1)$$

For the deviation $R_i$, an allowable width $\epsilon_i$ is set in order to avoid frequent operations of modifying the planned value. The modification of the planned value is made in accordance with the relationship between the deviation $R_i$ and the allowable width $\epsilon_i$, as follows:

(A) $|R_i| \leq \epsilon_i$

In case where all the zones fulfill this condition, the planned values of the treated water volume of the purification plant etc. are not modified in any of the zones.

(B) $|R_i| > \epsilon_i$

In this case, the modifications are made in two stages as follows:

Level 1: The modification is executed by the interchange among zones. That is, the planned value of the pipe flow to the zone i at a time (T+1) is modified. If the condition (A) is met by this modification, the modifying operation ends.

Level 2: Only when the conditions (A) is not met by the modification of the level 1, the planned values of the treated water volume of the purification plant etc. are modified.

The above modifications are illustrated in FIG. 4. Shown by a thick one-dot chain line is the planned value $\hat{V}_i(t)$ of the water storage volume in the zone. Even when the observed value at the time T deviates from the planned value $\hat{V}_i(t)$ as in, for example, an observed value 1 indicated by a thick solid line, the planned values of the treated water volume, the pipe flow etc, are not altered if the deviation $R_i$ thereof lies within the range of the allowable values $\epsilon_i$. In case where the deviation $R_i$ at the time T deviates from the allowable width $\epsilon_i$ as in an observed value 2 or 3, the planned values of the treated water volume, the pipe flow etc. are modified so that the water storage volume $V_i(T+1)$ in the zone may become the planned value $\hat{V}_i(T+1)$ at the next point of time (T+1).

Figure 5A:
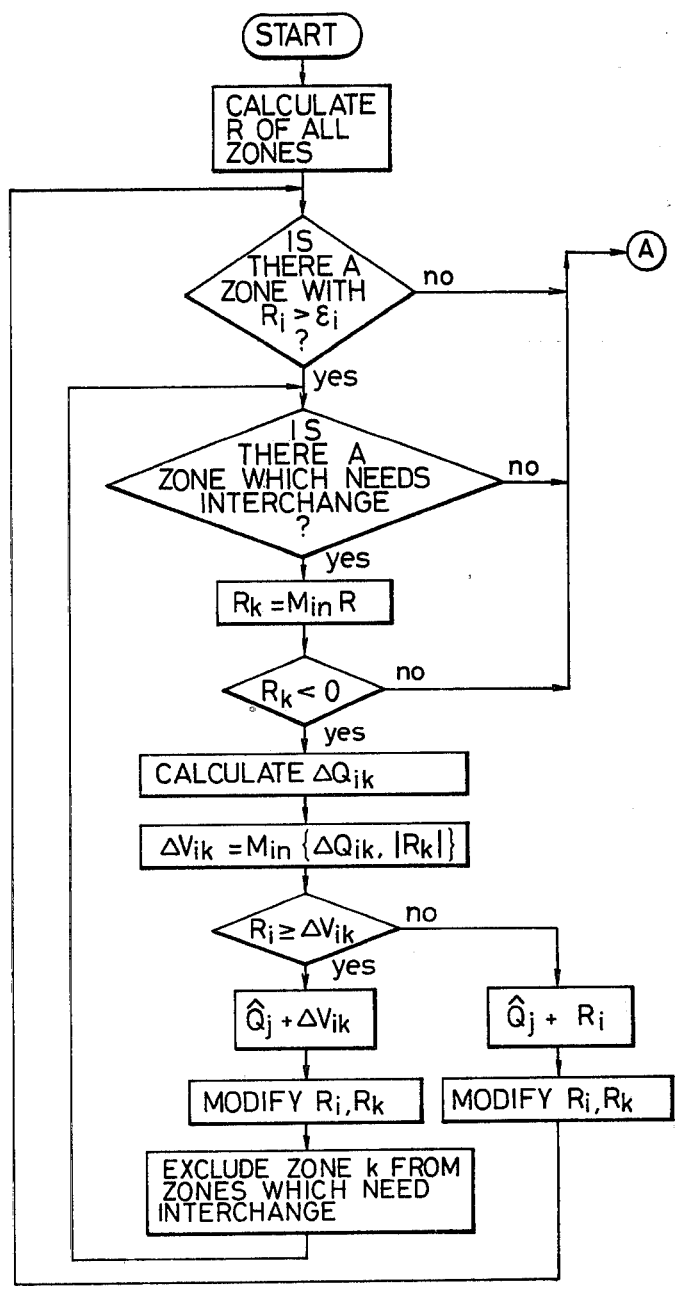
FIGS. 5A and 5B are partial flow diagrams obtained by dividing by two a flow chart illustrative of planned value-modifying operations according to this invention.
Figure 5B:
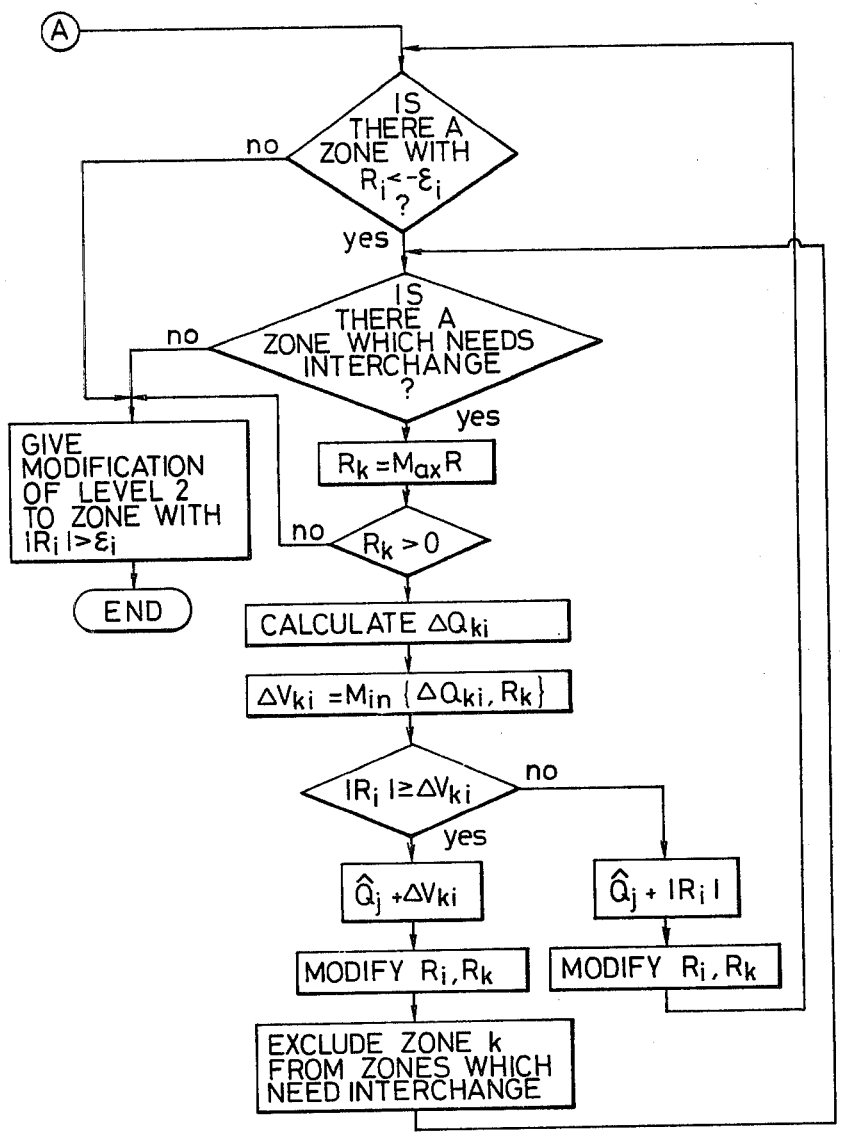

The modification of the level 1 will be described more in detail. The description will be better understood when reference is had to flow charts in FIGS. 5A and 5B.

First of all, the deviations R between the observed values V and the planned values $\hat{V}$ of the water storage volumes in the zones are evaluated in all the zones. Subsequently, whether or not any zone under $|R| > \epsilon$ exists is retrieved. It is assumed that the zone i which satisfies this condition has been found out.

(1) Case where $R_i > \epsilon_i$:

In this case, first of all, whether or not any zone needs a supplement from the zone i is retrieved. This is carried out by utilizing the deviations R for all the zones as already evaluated. The zone k whose deviation R is the minimum is found out, and whether this deviation $R_k$ is positive or negative is decided. If $R_k$ is negative, it is determined that water ought to be supplemented from the zone i to the zone k. The condition (A) is established by this supplement. In addition, the supplement must be made within the limitation of a pipe flow from the zone i to the zone k. The flow based on the limitation is now denoted by $\Delta Q_{ik}$. In case where the supplement from the zone i to the zone k is carried out via a pipe coupling the zone i and the zone k (a pipe consisting of a plurality of pipe sections), the maximum flow which can be fed from the zone i to the zone k is limited by the pipe section whose limitation is the greatest, and hence, the flow $\Delta Q_{ik}$ for the supplement is subject to limitation by the same. In general, accordingly, the flow is expressed as follows:

$$\Delta Q_{ik} = \text{Min} \left\{ \underset{j \epsilon p^+}{\text{Min}} \; (\overline{Q_j} - \hat{Q}_j(T+1)), \; \underset{j \epsilon p^-}{\text{Min}} \; \hat{Q}_j(T+1) \right\} \quad (2)$$

where j: No. of a pipe section included in a watercourse from the zone i to the zone k, $p^+$: Set of pipe sections included in the watercourse with their stream directions being forward with respect to the direction of the supplement, $p^-$: Set of pipe sections included in the watercourse with their stream directions being reverse with respect to the supplement direction, $\overline{Q_j}$: Maximum flow of the pipe section j, $\hat{Q}_j(T+1)$: Planned value of the pipe flow of the pipe section j at the time (T+1).

Since the water storage volume in the zone k must also be prevented from being in excess of the planned value, the quantity of the supplement cannot exceed $|R_k|$. Accordingly, the maximum quantity of supplement $\Delta V_{ik}$ becomes either smaller one of $\Delta Q_{ik}$ and $|R_k|$. That is, $\Delta V_{ik}$ is expressed as follows:

$$\Delta V_{ik} = \text{Min}\{\Delta Q_{ik}, |R_k|\} \tag{3}$$

When $\Delta V_{ik}$ has been evaluated, the modification is made according to the state of the zone i and for two individual cases as follows:

(1. 1) Case where $R_i \leq \Delta V_{ik}$:
In this case, the planned flow value $\hat{Q}_j(T+1)$ is modified as below with $R_i$ being a modification component.

$$\hat{Q}_j(T+1) = \hat{Q}_j(T+1) \pm R_i \tag{4}$$

In the above expression, $+R_i$ is taken for the pipe section belonging to the set $p^+$, and $-R_i$ is taken for the pipe section belonging to the set $p^-$.

With the above modification, the deviations $R_i$ and $R_k$ of the zones i and k are also modified as follows:

$$R_i = R_i - R_i = 0 \tag{5}$$

$$R_k = R_k + R_i \tag{6}$$

Then, the modification on the zone i in the case where $R_i \leq \Delta V_{ik}$ ends. The retrieval of any zone under $R > \epsilon$ is made again, and the foregoing processings are repeated.

(1. 2) Case where $R_i > \Delta V_{ik}$:
In this case, the planned flow value $\hat{Q}_j(T+1)$ is modified as below with $\Delta V_{ik}$ being a modification component.

$$\hat{Q}_j(T+1) = \hat{Q}_j(T+1) \pm \Delta V_{ik} \tag{7}$$

As in the preceding case, in the above expression, $+\Delta V_{ik}$ is taken for the pipe section belonging to the set $p^+$, and $-\Delta V_{ik}$ is taken for that belonging to the set $p^-$.

With the above modification, the deviations $R_i$ and $R_k$ of the zones i and k are subjected to the following modifications, whereupon the zone k is excluded from the zones which need the interchanges.

$$R_i = R_i - \Delta V_{ik} \tag{8}$$

$$R_k = R_k + \Delta V_{ik} \tag{9}$$

In this case, if the modified $R_i$ satisfies the condition $R_i \leq \epsilon_i$ in the zone i, that is, if the water storage volume in the zone i can be held within the allowable range at the next point of time $(T+1)$ by the modification, the modification on the zone i ends. Unless this in not met, the retrieval of any zone which needs the interchange is initiated again.

The above are the modifying operations in the case where $R_i > \epsilon_i$. Now, description will be made of a case where $R_i < -\epsilon_i$.

(2) Case where $R_i < -\epsilon_i$:
In this case, first of all, whether or not any zone can supplement water to the zone i is retrieved. At this time, if there is no zone capable of the supplement, the modification of the level 2 is executed for the zone i, and the modifying operation is completed.

In case where there are zones capable of the supplement, the zone k whose deviation R is the greatest is found out, and whether the deviation $R_k$ is positive or negative is decided. When $R_k < 0$, the zone i is subjected to the modification of the level 2. If $R_k > 0$, it is determined that water ought to be supplemented from the zone k to the zone i. It is the same as in the case (1) where $R_i > \epsilon_i$ that the supplement must be made within the limitation of the flows of the pipe sections from the zone k to the zone i. $\Delta Q_{ki}$ is accordingly evaluated as in the case (1) where $R_i > \epsilon_i$. In addition, since the water storage volume of the zone k must be prevented from becoming less than the planned value, the quantity of the supplement cannot exceed $R_k$. Accordingly, the maximum quantity $\Delta V_{ki}$ of the supplement becomes as follows:

$$\Delta V_{ki} = \text{Min}\{\Delta Q_{ki}, R_k\} \tag{10}$$

When $\Delta V_{ki}$ has been obtained, the modification is made according to the state of the zone i, that is, whether or not $|R_i|$ is greater than $\Delta V_{ki}$, likewise to the case (1) where $R_i > \epsilon_i$. The way of the modification is similar to that in the case (1) where $R_i > \epsilon_i$ (refer to FIG. 5B).

If all the zones have met the condition (A) by the modifications of the level 1 as above stated in the case (1) where $R_i > \epsilon_i$ and the case (2) where $R_i < -\epsilon_i$, the modification of the level 2 is not executed. In case where there is any zone which does not satisfy the condition (A), the zone is subjected to the modification of the level 2.

The modification of the level 2 is carried out as follows. By way of example, let it be supposed that $R_l > \epsilon_l$ holds in a zone l. Here, $R_l$ denotes a value after having been altered in the modification of the level 1. The planned value $\hat{Y}_l(T+1)$ of the treated water volume of the purification plant of the zone l at the next point of time $(T+1)$ is modified as follows:

$$\hat{Y}_l(T+1) = \hat{Y}_l(T+1) - R_l \tag{11}$$

That is, by altering the planned value of the treated water volume of the purification plant, the water storage volume in the zone comes to follow up its planned value at the time $(T+1)$.

As set forth above, according to this invention, the complicated pipe network of a waterworks system is turned into a simple network by the zoning, the demand prediction is made in every zone, and the necessary inflow of the zone is evaluated on the basis of the prediction. The planned values of various quantities for control are determined on the basis of the necessary inflow. Thus, an appropriate operation control is permitted even for the waterworks system having the complicated pipe network. In modifying the planned values of the various controlled variables in order to comply with the actual demand, the concept of the "water storage volume in the zone" is introduced, and an observed value thereof is utilized. Therefore, the time delay of flow involved in the transportation of water can be absorbed.

In addition, in modifying the planned values, priority is given to the modification of the planned value of a pipe flow corresponding to a flow to be interchanged between zones, over the alteration of the planned value of the treated water volume of a purification plant, thereby to restrain the operation of the purification plant to the minimum as required, so that an economical operation is realized as the whole waterworks system.

What is claimed is:
1. An operation control method for a waterworks system in which a plurality of zones are coupled by pipes, each of the zones including one purification plant and at least one service reservoir for supplying consumers with clear water fed from the purification plant; comprising the steps of:

determining in advance before initiation of an operation of a particular day, planned values of pipe flows to be interchanged among the zones, planned values of treated water volumes of the purification plants in the respective zones and planned values of water storage volumes of said respective zones at respective times of said particular day, thereafter controlling the treated water volumes of said purification plants and the pipe flows respectively on the basis of said planned values of said pipe flows and said planned values of said treated water volumes at said respective times and also observing values of the water storage volumes of said respective zones, at said respective times of said particular day, detecting deviations between the observed values of said water storage volumes and said planned values thereof in said respective zones, modifying in case where the deviation of one zone among said respective zones falls outside a predetermined range at a certain time, the planned value of the pipe flow between said one zone and at least one other zone after said certain time, and controlling the pipe flow between said one zone and said one other zone on the basis of the modified planned value thereof, and modifying only in case where said deviation of said one zone is not yet put into said predetermined range by the aforecited modification, the planned value of the treated water volume of the purification plant in said one zone, and after said certain time controlling the treated water volume of said purification plant of said one zone on the basis of the modified planned value thereof.

2. An operation control method as defined in claim 1, wherein said one other zone is a zone having a deviation being opposite in sign to said deviation of said one zone and the greatest deviation in absolute value.

3. An operation control method as defined in claim 2, wherein said step of modifying the planned value of the pipe flow includes modifying a planned value of the pipe flow between said one zone and at least a zone other than said zone having the greatest deviation after modifying said planned value of said pipe flow between said one zone and said zone having the greatest deviation.

4. An operation control method as defined in claim 2 or 3, wherein a magnitude of the modification of said planned value of said pipe flow between said one zone and said zone having said greatest deviation is made to equal at most the absolute value of said greatest deviation.

5. An operation control method for a waterworks system in which a plurality of zones are coupled by pipes, each of the zones including one purification plant and at least one service reservoir for supplying consumers with clear water fed from the purification plant, comprising the steps of:

setting, before initiation of an operation of a particular day, desired values of pipe flows to be interchanged among the zones, desired values of treated water volumes of the purification plants in the respective zones, and desired values of water storage volumes of the respective zones at respective times of the particular day;

controlling the treated water volumes of the purification plants and the pipe flows respectively in accordance with the set desired values of the pipe flows and set desired values of the treated water volumes at the respective times;

measuring the values of the water storage volumes of the respective zones at the respective times of the particular day;

detecting deviations between the measured values of the water storage volumes and the set desired values of the water storage volumes in the respective zones;

determining whether the deviation of one zone among the respective zones falls outside of a predetermined range of deviation at a certain time;

modifying the set desired value of the pipe flow between the one zone and at least one other zone after the certain time in response to the determined deviation of the one zone falling outside the predetermined range; and controlling the pipe flow between the one zone and the one other zone in accordance with the modified value therefor.

6. An operation control method as defined in claim 5, further comprising the steps of:

detecting whether the deviation of the one zone continues to fall outside the predetermined range of deviation after the control of the pipe flow between the one zone and the one other zone according to the modified value is effected;

modifying the desired set value of the treated water volume of the purification plant in the one zone only in the case where the deviation of the one zone continues to fall outside of the predetermined range of deviation; and controlling the treated water volume of the purification plant of the one zone in accordance with the modified value therefor.

7. An operation control method as defined in claim 6, wherein the one other zone is a zone having a deviation opposite to the direction of deviation of the one zone, the deviation of the one other zone being greater in absolute value than any other zone of the waterworks system.

8. An operation control method as defined in claim 7, wherein the step of modifying the desired set value of the pipe flow includes modifying a desired set value of the pipe flow between the one zone and at least a zone other than the zone having the greater deviation after modifying the desired set value of the pipe flow between the one zone and the zone having the greater deviation.

9. An operation control method as defined in claim 7, wherein the modification of the set desired value of the pipe flow between the one zone and the zone having the greater deviation is of a magnitude no greater than the absolute value of the greater deviation.

* * * * *